United States Patent [19]

Dunbar

[11] 4,347,904

[45] Sep. 7, 1982

[54] WEIGHT CART CALIBRATION APPARATUS

[76] Inventor: Glenn G. Dunbar, 2608 Overbrook, Toledo, Ohio 43614

[21] Appl. No.: 226,723

[22] Filed: Jan. 21, 1981

[51] Int. Cl.³ .................... G01G 19/52; G01L 25/00
[52] U.S. Cl. ........................................ 177/50; 73/1 B
[58] Field of Search ...................... 177/50, 16; 73/1 B

[56] References Cited

U.S. PATENT DOCUMENTS

| | | | |
|---|---|---|---|
| 2,974,518 | 3/1961 | Jones | 177/16 X |
| 3,396,573 | 8/1968 | Blubaugh | 177/16 X |
| 3,785,297 | 1/1974 | Barnard et al. | 73/1 B X |
| 4,048,843 | 9/1977 | Dunbar | 73/1 B |
| 4,249,633 | 2/1981 | Dunbar | 73/1 B X |

*Primary Examiner*—George H. Miller, Jr.
*Attorney, Agent, or Firm*—Emch, Schaffer & Schaub

[57] ABSTRACT

An improved scale testing cart for selectively positioning scale calibration weights on platform scales is disclosed. The scale testing cart has a weight bed for retaining selected calibration weights and has a tubular frame adjacent one end of the weight bed which is adapted for holding a fluid. A first pair of wheels is attached to the weight bed at a position adjacent the tubular frame and a second pair of wheels is attached at the end of the weight bed which is opposed to the tubular frame. A hollow member is positioned between the second set of wheels and is adapted to retain ballast. A lift bar for engaging a lifting apparatus is positioned substantially at the weight center-line of the cart. Located adjacent the tubular frame is a drive means which generally includes a drive engine, gas tank, and hydraulic drive pump for propelling the cart.

11 Claims, 7 Drawing Figures

WEIGHT CART CALIBRATION APPARATUS

BACKGROUND OF THE INVENTION

The invention is directed generally to a scale testing cart adapted to transport calibrated weights for the calibration of high capacity performance scales and more specifically to a means for balancing the scale cart as it is lifted and transported from the bed of a larger weight transportation vehicle onto the platform scales, and further; a means for substantially fine tuning the combined weight of the scale testing cart and calibration weights carried by the cart to a predetermined weight.

Platform scales are well known and are utilized for many purposes. For example, platform scales are utilized by commercial enterprises which deal in large quantities of bulk materials, such as grain elevators. Similarly, government regulations create a demand for the use of platform scales to determine whether semi-tractor and trailer units are in compliance with the highway load limits delineated by state vehicle weight limit enforcement programs. Common weight loads for platform scales generally range from 20 tons to 100 tons.

Platform scales are often designed to combine a plurality of individual platforms by mechanical linkage or by electronic load cells. As a vehicle rests on one or more of the platforms, its weight will be accurately transmitted to the indicator through the mechanical linkage or electronic load.

Because of the applications in which platform scales are used, dirt and friction have a tendency to build up at critical points in the linkages, thereby restricting the action of the mechanisms. When this occurs, the scales do not indicate a weight which corresponds to the actual weight of the load. Similarly, drift in the components of electronic scales will effect their calibration, causing the reading to not correspond with the proper weight. In either event, overpayment or underpayment for a load of bulk material or mistakes in weighing a properly loaded vehicle are manifest.

It is important to periodically calibrate platform scales in order to counter the difficulties described above. In the past, platform scales have been tested by placing individual weight units, normally 500 pound units or 1000 pound units, upon the individual platform sections of a scale. Obviously, this method requires a considerable amount of time and manpower to unload the weights, test the scales and reload the weights onto the weight transporting vehicle.

In addition to the recognized need for calibration, it is also known that the accuracy of platform scales will vary at different loadings. That is, scales may indicate the correct weight at one point in their range but exhibit a deviation from the correct indication at another point of their range. Therefore, calibration techniques required by state agencies commonly require platform scales to be calibrated at different loadings, the heaviest loading often being substantially above the scales' rated capacity.

Furthermore, it has been found that the particular placement of a vehicle on a scale platform also effects the indication of the scales. Approved calibration techniques therefor also require that the scales be calibrated with the weights positioned at various locations upon the scale platform. The constraint of time and the necessity of varying the amount and location of weight on a scale to insure proper calibration suggests that a device which is easily transportable, which is capable of carrying a substantial quantity of calibration weights, which uniformly distributes the weight it is carrying and which is easily moveable about a platform scale is desirable.

One solution involves a vehicle which carries a selected quantity, up to eighteen thousand pounds, of calibration weights. The vehicle is small enough to be carried to the platform scale undergoing calibration on the bed of the weight transportation vehicle, and is also capable of being maneuvered about a platform scale to various desired locations.

SUMMARY OF THE INVENTION

The present invention discloses a scale testing cart which selectively positions calibrated weights on platform scales for the purposes of calibrating the scale. The scale testing cart has a weight bed to hold a plurality of calibration weights. A rail structure is positioned around the perimeter of the weight bed to retain the calibration weights on the weight bed. The rail structure located at one end of the weight bed is tubular and adapted for holding a fluid. The scale testing cart has a first pair of wheels attached at the end of the weight bed adjacent the tubular frame. A second pair of wheels is attached at the end of the weight bed which is opposed to the tubular frame. A hollow member is positioned between the second pair of wheels and is adapted to retain ballast. A lift bar, to assist in moving the scale testing cart from the bed on the weight transportation vehicle to the platform scale, is located substantially at the weight center-line of the scale testing cart. A drive mechanism, including a drive engine, gas tank and a hydraulic pump is positioned adjacent the tubular frame.

To transport the scale testing cart from the bed of the weight transportation vehicle to the platform scale, the cart can be generally balanced on the lifting apparatus by coordinating the level of gasoline in the gas tank and the level of fluid within the tubular frame with the amount of ballast in the hollow member. When ready for operation, the cart can be calibrated to a specific weight by adding or removing fluid from the tubular frame or ballast from the hollow member. After the weight of the scale testing cart is calibrated, the desired number of calibration weights can be placed on the weight bed. Thus, substantial fine tuning of the total calibrated weight of the scale testing cart is possible.

It is an object of this invention to provide a means for balancing a scale testing cart on the lifting apparatus of a weight transportation vehicle without necessitating any design changes in the lifting apparatus.

Another object of this invention is to balance the scale testing cart so that it may safely be picked up by the lifting apparatus.

Yet another object of this invention is to be able to substantially fine tune the total calibrated weight of the scale testing cart to the desired predetermined testing weight.

DETAILED DESCRIPTION OF THE DRAWINGS

Figure 1:
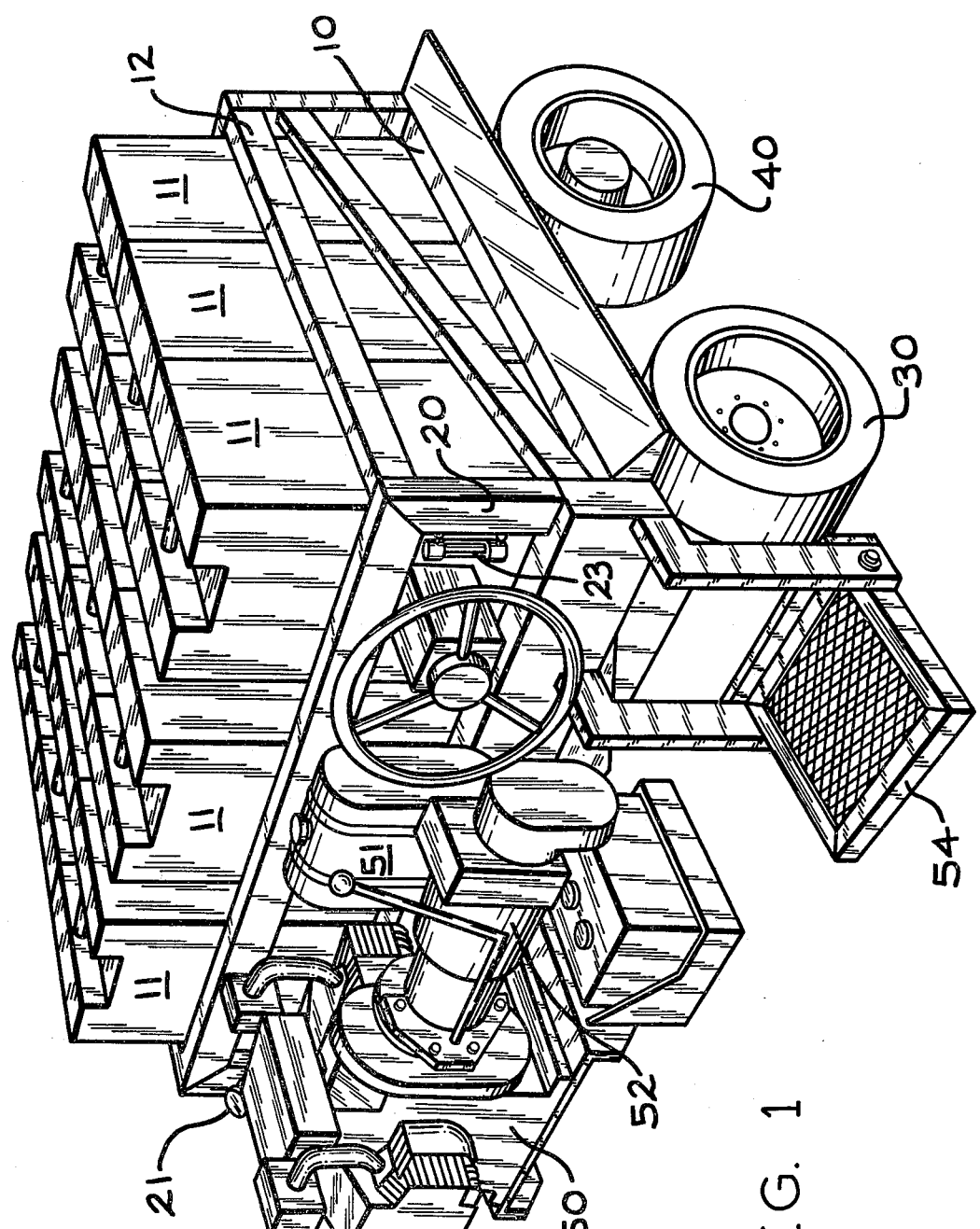
FIG. 1 is a perspective view of the scale testing cart in accordance with the present invention.
Figure 2:
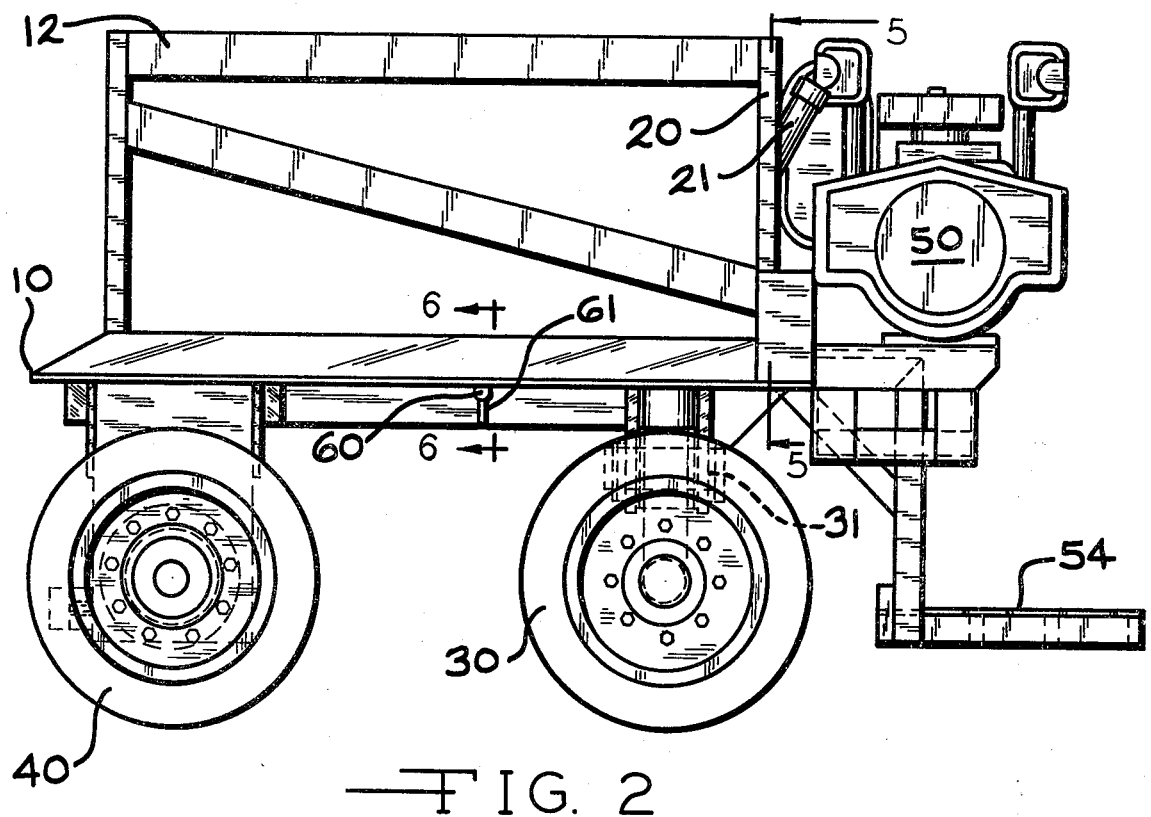
FIG. 2 is a side view of the scale testing cart in accordance with the present invention.
Figure 3:
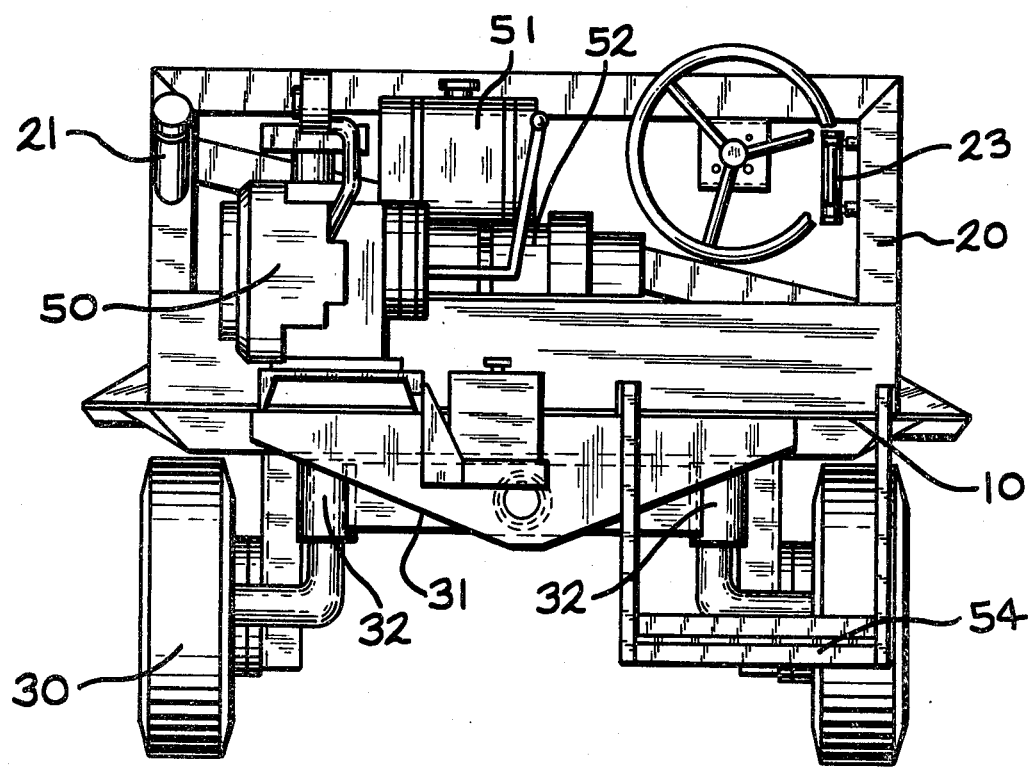
FIG. 3 is a rear view of the scale testing cart in accordance with the present invention.
Figure 4:
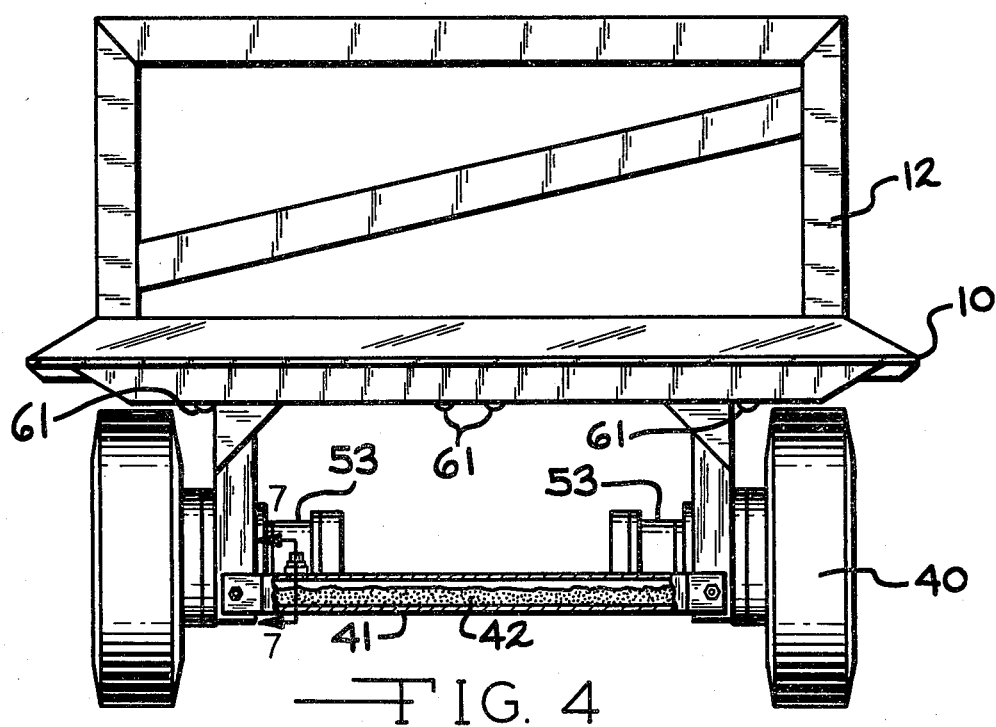
FIG. 4 is a front view of the scale testing cart, in accordance with the present invention, having the hollow member cut away to show the ballast.
Figure 5:
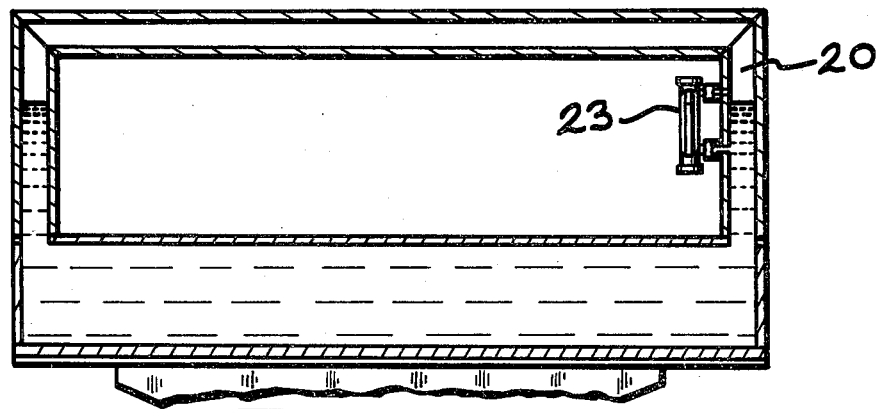
FIG. 5 is a cross sectional view of the present invention along line 5—5 of FIG. 2.
Figure 7:
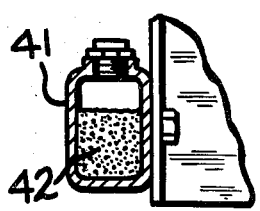
FIG. 7 is a cross sectional view of the present invention along line 7—7 of FIG. 4.
Figure 6:
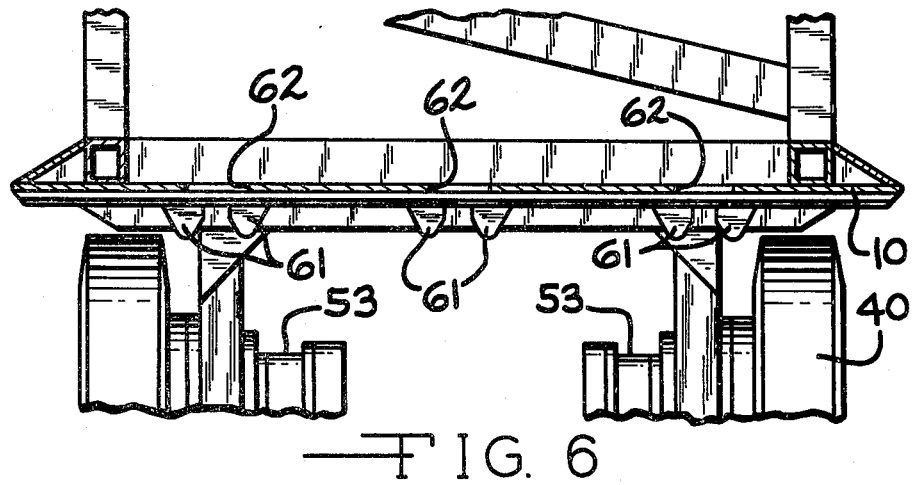
FIG. 6 is a cross sectional view of the present invention along line 6—6 of FIG. 2.

The invention is directed generally towards the scale testing cart as shown in FIG. 1, and more specifically to the balancing and calibration fine tuning apparatus as shown in FIGS. 2-7. The scale testing cart of the present invention has a weight bed 10 which holds a selected plurality of calibration weights 11. Located at one end of the weight bed 10 is a tubular frame 20 which is adapted for holding a fluid. At the end of the weight bed 10, adjacent the tubular frame 20, is a first pair of wheels 30. A second pair of wheels 40 is attached at the end of the weight bed 10 which is opposed to the tubular frame 20. Positioned between the second pair of wheels 40 is a hollow member 41 which is adapted to retain ballast 42. The scale testing cart has a drive means located adjacent the tubular frame 20 which basically includes a drive engine 50, gas tank 51 and a hydraulic drive pump 52 which propels the cart. A lift bar 60, which is utilized in lifting and transporting the scale testing cart, is positioned substantially at the weight center-line of the cart.

A rail structure 12 is positioned around the perimeter of the weight bed 10 to retain the calibration weights 11 on the weight bed. A portion of the rail structure 12 incorporates the tubular frame 20. The tubular frame 20 includes a spout 21 through which the fluid is introduced into the tubular frame 20 and a valve or spigot (not shown) through which the fluid is removed.

An axle 31 is attached to the underside of the weight bed 10 adjacent the tubular frame 20, and each of the first pair of wheels 30 is rotatably attached to the ends 32 of the axle 31. The first pair of wheels 30 also includes a mechanism for steeringly positioning the scale testing cart as it is maneuvered. The steering mechanism is conventional and will not be described further, as it does not form a part of this invention.

A hydraulic drive motor 53 is attached to each of the second pair of wheels 40. The hydraulic drive motors 53 are driven by the hydraulic drive pump 52 which in turn is powered by the drive engine 50. Positioned adjacent the drive engine 50, gas tank 51, and hydraulic drive pump 52 is an operator's platform 54 and the necessary apparatus for maneuvering the scale testing cart. Located at a point in close proximity to the operator's platform 54 is a site gauge 23 which assists the operator in determining the level of fluid retained within the tubular frame 20.

The lift bar 60 is fixed to the underside of the weight bed 10 at substantially the weight center-line of the scale testing cart. The lift bar 60 has a plurality of spaced guides 61 which assist the lifting apparatus to engage the lift bar 60 in a balanced manner. Apertures 62 are defined in the weight bed 10 adjacent each of the guides 61. The lifting apparatus (not shown) is inserted through the apertures 62 in the weight bed 10 to engage the guides 61 and lift bar 60 and lift the scale testing cart. The lifting apparatus can be of conventional design as commonly used on any weight transportation vehicle and forms no part of this invention.

In operation, the scale testing cart is transported, to the platform scale to be calibrated, by a weight transportation vehicle. The lifting apparatus on the weight transportation vehicle, which is used to move the calibration weights 11 from the weight transportation vehicle onto either the scale testing cart or the platform scale, is used to lift the scale testing cart from the weight transportation vehicle onto the platform scale. The lifting apparatus is inserted through the apertures 62 in the weight bed 10 to engage the lift bar 60 and guides 61 on the underside of the weight bed 10. When the scale testing cart is suspended on the lifting apparatus the testing cart can be properly balanced by adjusting the level of fluid in the tubular frame 20 with the amount of gasoline in the gas tank 51. The level of fluid in the frame and the quantity of gas in the tank are used to counterbalance the ballast 42 retained in the hollow member 41. The weight cart will be suspended in a substantially level attitude on the lifting apparatus when the weight cart is properly balanced. With the weight cart balanced the weight or load on each axle of the cart will be substantially equal. The actual weight of the cart can be determined after the cart has been balanced so that when the calibration weights are added to the cart the total weight of the cart will be known. When the cart is properly balanced and the weight of the cart determined, the level of gasoline in the tank and the level of fluid in the frame can be marked so that the cart can be balanced and the weight calibrated by filling the gasoline tank and the frame to the levels marked. The sight gauge 23 is particularly useful in determining the proper level for the fluid in the frame 20. When the cart is substantially balanced the calibration weights 11 are selectively placed onto the weight bed 10 by the lifting apparatus in order to proceed with the calibration of the platform scales.

It will be apparent to those skilled in the art that various modifications may be made to the preferred embodiment described above without departing from the spirit and scope of the following claims.

What I claim is:

1. A scale testing cart for selectively positioning scale calibration weights on platform scales, comprising in combination:

a bed for retaining a plurality of calibration weights;

a tubular frame positioned at one end of said bed, said tubular frame being adapted for holding a fluid;

a hollow member positioned at the other end of said bed, said hollow member being adapted to retain ballast means;

drive means positioned adjacent said tubular frame, said drive means including a drive engine and gas tank and a hydraulic drive pump for propelling said cart; and a lift bar positioned substantially at the weight center-line of said cart whereby the fluid in said tubular frame can be varied to balance said cart when said cart is suspended on said lift bar.

2. The cart of claim 1 wherein said tubular frame includes means for determining the level of fluid retained within said tubular frame.

3. The cart of claim 2 wherein said means for determining the level of fluid in said frame is a site gauge.

4. The cart of claim 1 wherein said tubular frame includes a means for introducing a fluid into said tubular frame and a means for removing the fluid from said tubular frame.

5. The cart of claim 1 wherein said hollow member includes a means for introducing ballast to said hollow member and means for removing ballast from said hollow member.

6. The cart of claim 1 wherein said lift bar is fixed to the underside of said weight bed.

7. The cart of claim 6 wherein said lift bar defines a plurality of spaced guides on the underside of said weight bed, said guides being positioned to engage a means for lifting said cart.

8. The cart of claim 7 wherein said weight bed defines a plurality of apertures, each of said apertures being positioned adjacent each of said guides.

9. The cart of claim 8 wherein said means for lifting said cart engages said lift bar and said spaced guides through said apertures in said weight bed.

10. A scale testing cart for selectively positioning scale calibration weights on platform scales, comprising in combination:

a weight bed for retaining a plurality of calibration weights;

a rail structure positioned about the perimeter of said weight bed, said rail structure retaining two levels of stacked calibration weights on said weight bed;

a tubular frame attached to said rail structure at one end of said weight bed, said tubular frame adapted for retaining a fluid, said tubular member including a means for introducing a fluid into said tubular frame and a means for removing fluid from said tubular frame, said tubular frame further having a site gauge for determining the level of fluid retained within said tubular frame;

a first pair of wheels attached to the end of said weight bed adjacent said tubular frame;

a second pair of wheels attached to the other end of said weight bed which is opposed to said tubular frame;

a hollow member for retaining ballast positioned laterally between said second pair of wheels, said hollow member having a means for introducing ballast to said hollow member and a means for removing ballast from said hollow member;

a drive means positioned adjacent said tubular frame, said drive means including a drive engine, a gas tank and a hydraulic drive pump for propelling said cart;

a lift bar fixed to the underside of said weight bed at substantially the weight center-line of said cart;

a plurality of spaced guides adjacent said lift bar on the underside of said weight bed, said spaced guides being positioned to engage means for lifting said cart; and a plurality of spaced apertures located in said weight bed, each of said spaced apertures being positioned adjacent each of said spaced guides, whereby means for lifting said cart can engage said lift bar and said spaced guides through said apertures in said weight bed.

11. The cart of claim 10 wherein the weight and balance of said cart is substantially balanced on said lifting means by coordinating the amount of gasoline in said gas tank and said fluid in said tubular frame with said ballast in said hollow member.

* * * * *